(12) United States Patent
Sata

(10) Patent No.: US 6,304,267 B1
(45) Date of Patent: Oct. 16, 2001

(54) IMAGE GENERATING SYSTEM AND INFORMATION STORAGE MEDIUM CAPABLE OF CHANGING ANGLE OF VIEW OF VIRTUAL CAMERA BASED ON OBJECT POSITIONAL INFORMATION

(75) Inventor: Hironori Sata, Yokohama (JP)

(73) Assignee: Namco Ltd., Tokyo (JP)

( * ) Notice: Subject to any disclaimer, the term of this patent is extended or adjusted under 35 U.S.C. 154(b) by 0 days.

(21) Appl. No.: 09/094,472

(22) Filed: Jun. 10, 1998

(30) Foreign Application Priority Data

Jun. 13, 1997 (JP) .................................................. 9-173154

(51) Int. Cl.[7] ............................. G06T 15/10; G06T 15/00
(52) U.S. Cl. ............................................ 345/427; 345/419
(58) Field of Search .......................... 345/438, 424–428, 345/113–115, 473–474, 349, 419–421, 952, 977, 956–959, 967, 329, 326–327, 978; 463/31; 342/126; 340/825.06, 825.31

(56) References Cited

U.S. PATENT DOCUMENTS

| 5,363,297 | * | 11/1994 | Larson et al. | 342/126 |
| 5,779,548 | * | 7/1998 | Asai et al. | 463/31 |
| 5,812,142 | * | 9/1998 | Small et al. | 345/438 |
| 5,850,352 | * | 12/1998 | Moezzi et al. | 345/419 |
| 5,880,734 | * | 12/1998 | Light | 345/419 |
| 6,034,692 | * | 3/2000 | Gallery et al. | 345/427 |

FOREIGN PATENT DOCUMENTS

| 61-193688 | 8/1986 | (JP) . |
| 07-178242 | 7/1995 | (JP) . |
| 7-116343 | 9/1995 | (JP) . |
| 8-149600 | 6/1996 | (JP) . |
| 8-155143 | 6/1996 | (JP) . |
| 9-50541 | 2/1997 | (JP) . |

* cited by examiner

*Primary Examiner*—Matthew Luu
*Assistant Examiner*—Chante' Harrison
(74) *Attorney, Agent, or Firm*—Oliff & Berridge, PLC

(57) ABSTRACT

An image generating system and information storage medium for generating an image preferable for a game in which a virtual camera follows a displayed object. The angle of view θ of the virtual camera is changed based on the coordinates of the player's game character and ball while causing the virtual camera to follow the player's game character. As the distance D between the player's game character and the ball decreases or increases, the angle of view θ is increased or decreased. Thus, the player can clearly grasp information about things around the ball. If the distance D becomes shorter than a threshold value $D_{th}$, the angle of view θ is set at a fixed value $θ_{fix}$. This prevents an image from being distorted. The ball is always displayed on the screen in the central part thereof by directing the virtual camera in a direction from the player's game character toward the ball. The first and second displayed objects represent respectively a first and second game characters in a fighting game and a character and item in a role-playing game.

29 Claims, 15 Drawing Sheets

SMALL AND FIXED ANGLE OF VIEW

ANGLE OF VIEW FIXED TO $\theta_2$

LARGE AND FIXED ANGLE OF VIEW

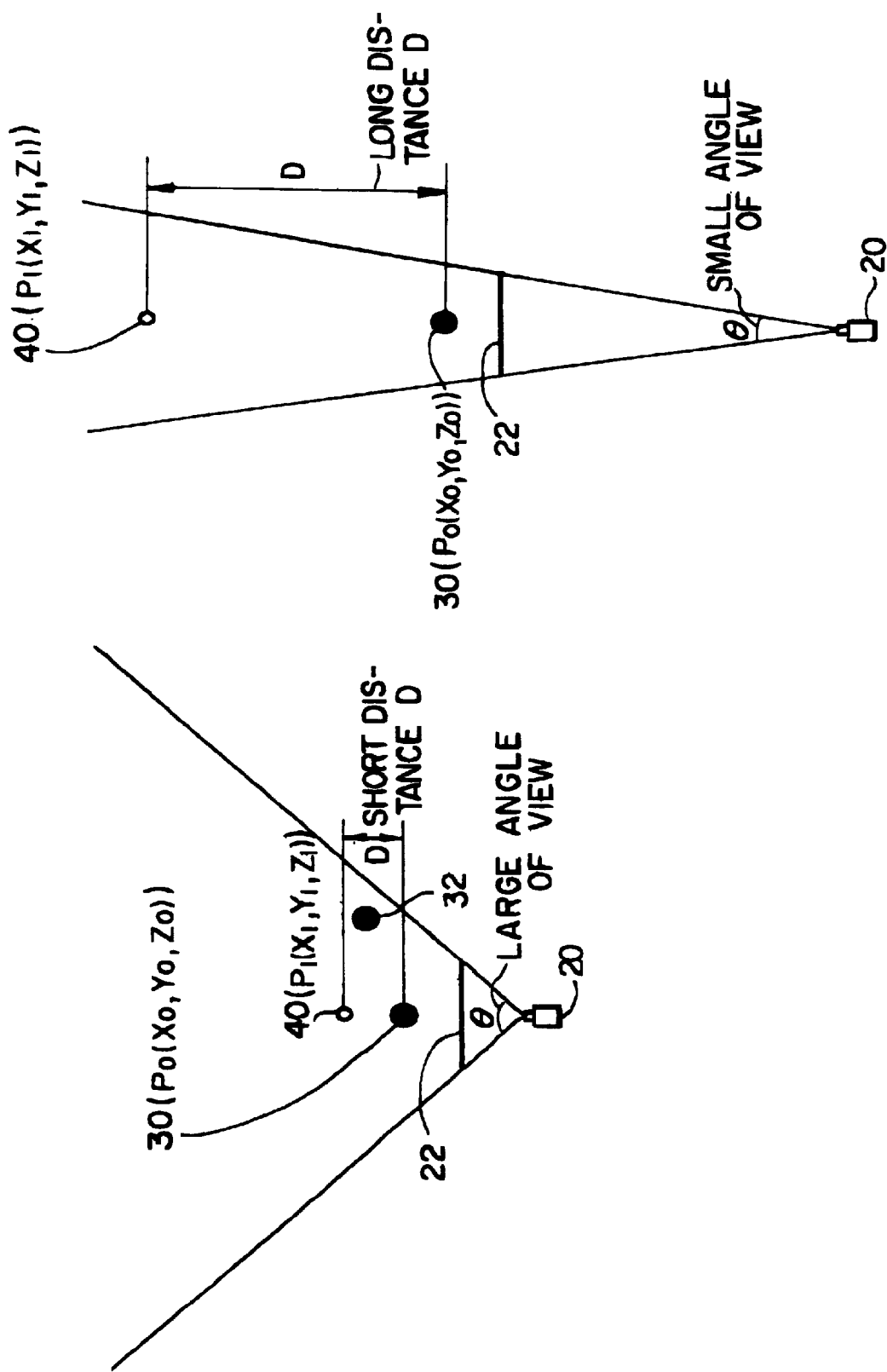

SHORT DISTANCE AND LARGE ANGLE OF VIEW

LONG DISTANCE AND SMALL ANGLE OF VIEW

SHORT DISTANCE AND LARGE ANGLE OF VIEW

LONG DISTANCE AND SMALL ANGLE OF VIEW

FIXED ANGLE OF VIEW

SHORT DISTANCE AND LARGE ANGLE OF VIEW

LONG DISTANCE AND SMALL ANGLE OF VIEW

IMAGE GENERATING SYSTEM AND INFORMATION STORAGE MEDIUM CAPABLE OF CHANGING ANGLE OF VIEW OF VIRTUAL CAMERA BASED ON OBJECT POSITIONAL INFORMATION

BACKGROUND OF THE INVENTION

1. Field of the Invention

The present invention relates to an image generating system for generating an image as seen from a virtual camera in an object space and an information storage medium used in this image generating system.

2. Prior Art

There is known an image generating system which generates images of objects as seen from a virtual camera when the objects are arranged within a virtual three-dimensional space or an object space. Such a system is very popular because of providing a so-called virtual reality.

With such image generating system used in a soccer simulation game, for example, a player enjoys controlling a game character on a screen who passes a ball or kicks a goal. By using this image generating system, the player feels as if he/she were actually playing soccer.

In the conventional soccer simulation games, a game character which is controllable by a player is not fixed, and may be a game character that keeps a ball, for example. More particularly, when the player controls a first game character and then passes a ball to a second game character, the player's game character is changed from the first game character to the second game character. For such a reason, the virtual camera does not follow one fixed character.

However, such a soccer simulation game according to the prior art has the following problems.

First of all, the player must do a complicated control since a game character controlled by the player is frequently changed from one to another during the game play. Game beginners tend to avoid such a complicated game.

Second, the player cannot easily feel strong affection for his or her game character or enthusiasm about the game. In such a type of simulation games, game characters are often modeled on actual star players. However, if there is a game character modeled on the player's favorite soccer star, the player cannot always control that game character in a conventional soccer simulation game in which the player's controllable game character is frequently changed. Thus it is difficult to feel strong affection for the player's game character and enthusiasm about the game.

Thus, the conventional soccer simulation games are disadvantageous in that the player's game character is frequently changed and that the virtual camera does not follow one fixed player's game character.

Therefore, the inventor has developed a soccer simulation game of such a type that the player's game character is fixed to a particular one and that the virtual camera follows that fixed character.

When the player's game character cannot touch a ball in such a new simulation game, however, the player's game character has to wait and watch the play of other game characters. It is thus required to generate interesting game images to avoid a lack of concentration of the player.

SUMMARY OF THE INVENTION

To overcome the aforementioned problems in the prior art, it is therefore an object of the present invention to provide an image generating system and information storage medium for generating an image preferable for a game in which a virtual camera follows a displayed object.

According to a first aspect of the present invention, there is provided an image generating system for generating an image as seen from a virtual camera in an object space in which at least first and second displayed objects are disposed, the image generating system comprising:

means for causing the virtual camera to follow the first displayed object and for changing the angle of view of the virtual camera based on positional information about the first and second displayed objects; and means for generating an image as seen from the virtual camera.

In this way, an image as seen from the virtual camera following the first displayed object can be generated. The virtual camera follows the first displayed object with inertia, for example. The angle of view of the virtual camera is changed depending on the positional information (e.g., coordinates) of the first and second displayed objects. Thus, the angle of view of the virtual camera can reflect changing of the positional information of the first and second displayed objects. Accordingly, an image which reflects such a positional relationship can be generated.

The angle of view of the virtual camera may be increased as the distance between the first and second displayed objects decreases, and the angle of view of the virtual camera may be decreased as the distance between the first and second displayed objects increases. When the distance between the first and second displayed objects is relatively short, a generated image represents information about things around the first displayed object in detail, for example. When the distance is relatively long, a generated image can represent information about things around the second displayed object in detail, for example.

The angle of view of the virtual camera may set to a fixed value when the distance between the first and second displayed objects becomes smaller than a given threshold value. A technique by which the angle of view is simply increased as the distance between the first and second displayed objects decreases may produce distortion of image when the distance becomes less than a given value. By fixing the angle of view to a given value when the distance is less than the threshold value, such distortion of image can effectively be avoided, The virtual camera may be directed in a direction from the first displayed object or the vicinity of the first displayed object toward the second object or the vicinity of the second displayed object. Thus, the second displayed object can always be displayed on the screen at a position near the gazing point of the virtual camera, for example.

The virtual camera may follow the first displayed object with inertia. Even if the position or direction of the first displayed object is rapidly changed, images can be smoothly displayed.

The first displayed object may represent a game character and the second displayed object may represent a ball controllable by the game character in a game which is played by using the image generated by the image generating system. Thus, an image which is very suitable for use in a ball handling sports simulation game or other games can be generated.

The first displayed object may represent a first game character and the second displayed object may represent a second game character who fights against the first game character in a game which is played by using the image generated by the image generating system. Thus, an image which is very suitable for use in a fighting game performed between the first and second game characters or other games can be generated.

The first displayed object may represent a game character and the second displayed object may represent an item to be obtained by the game character in a game which is played by using the image generated by the image generating system. Thus, an image which is very suitable for use in a role-playing game in which a game character travels within a map for items or other games can be generated.

According to a second aspect of the present invention, there is provided an image generating system for generating an image which is used to play a sports simulation game by a player, the image representing a plurality of displayed objects including a game character controlled by the player through a control means and a ball controllable by the game character, the image generating system comprising:

means for computing positional information about the game character and the ball in each frame based on operation information inputted through the control means;

means for causing a virtual camera to follow the game character and for changing the angle of view of the virtual camera based on the positional information about the game character and the ball; and means for generating an image as seen from the virtual camera in an object space in which a plurality of the objects including the game character and the ball are disposed.

In this way, the positional information relating to the game character controlled by the player and the ball in each frame can be computed. The angle of view of the virtual camera is changed in real time based on the positional information of these game character and ball. Thus, an image which reflects the positional relationship between the game character and the ball can be provided so that the player can enjoy the sports simulation game very much.

The player may control only one particular game character which is selected from a plurality of game characters in the game. If a character controllable by the player is fixed to a particular one and when other character keeps the ball, the player has to watch the motion of the other character or ball. In such a case, the angle of view may be changed such that the motion of the ball can be clearly seen, for example. Even though the player's game character does not keep the ball, therefore, the enthusiasm about the game can be maintained.

BRIEF DESCRIPTION OF THE DRAWINGS

FIG. 3 is a view illustrating the principle of the present embodiment.

DETAILED DESCRIPTION OF PREFERRED EMBODIMENT

A preferred embodiment of the present invention will now be described with reference to the drawings.

First of all, characteristics of the embodiment are described. Although the present invention is applied to a soccer simulation game in this embodiment, a game to which the present invention can be applied is not limited to it.

In this embodiment, the player's game character is one fixed character and the virtual camera follows the fixed player's game character with inertia to generate images. Using this technique, however, there are some problems to be solved as follows.

Figure 1A:
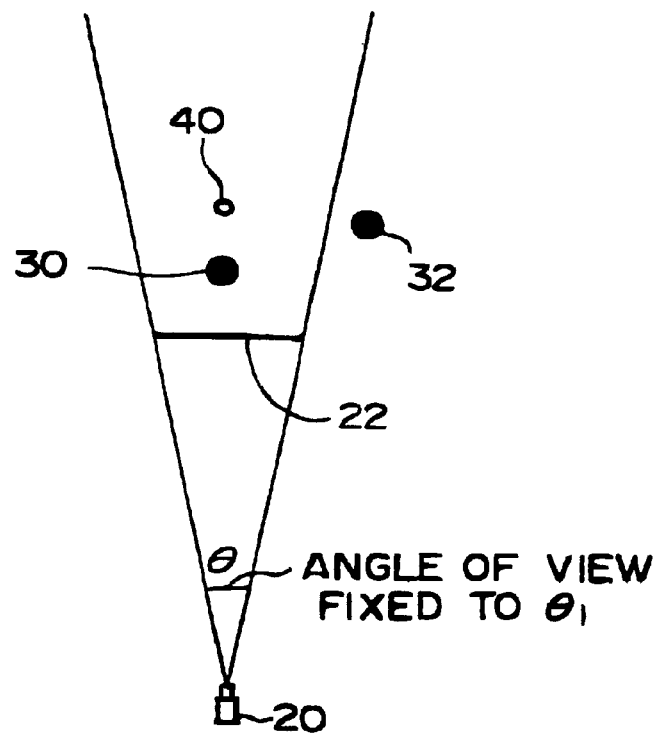
FIGS. 1A and 1B are views illustrating a case when the angle of view is fixed to a relatively small value
Figure 1B:
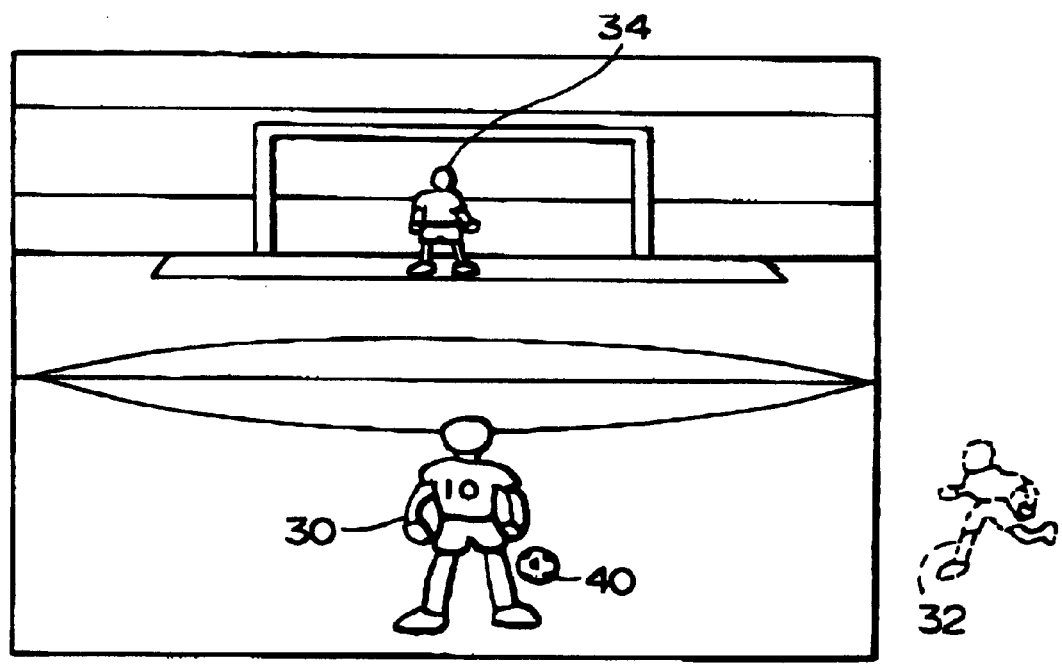

It is now assumed that the angle of view θ of a virtual camera 20 is fixed to an angle θ, which is relatively small, as shown in FIG. 1A. In this time, a distance between the virtual camera 20 and a screen (projection surface) 22 is relatively long. An image generated in such a case is shown in FIG. 1B. As shown in FIG. 1B, the player cannot see another game character 32 who is in the vicinity of a player's game character 30 but out of the angle $θ_f$. In other words, when the angle of view θ of the virtual camera 20 is fixed to a relatively small angle, a goalkeeper 34 who is in the distance from the player's game character can be clearly seen, for example, but information of things near the player's game character 30 may be eliminated. Thus, there may be produced a case where the game character 32 suddenly enters in view of the player and a ball 40 is undesirably taken from the player's game character by the game character 32.

Figure 2A:
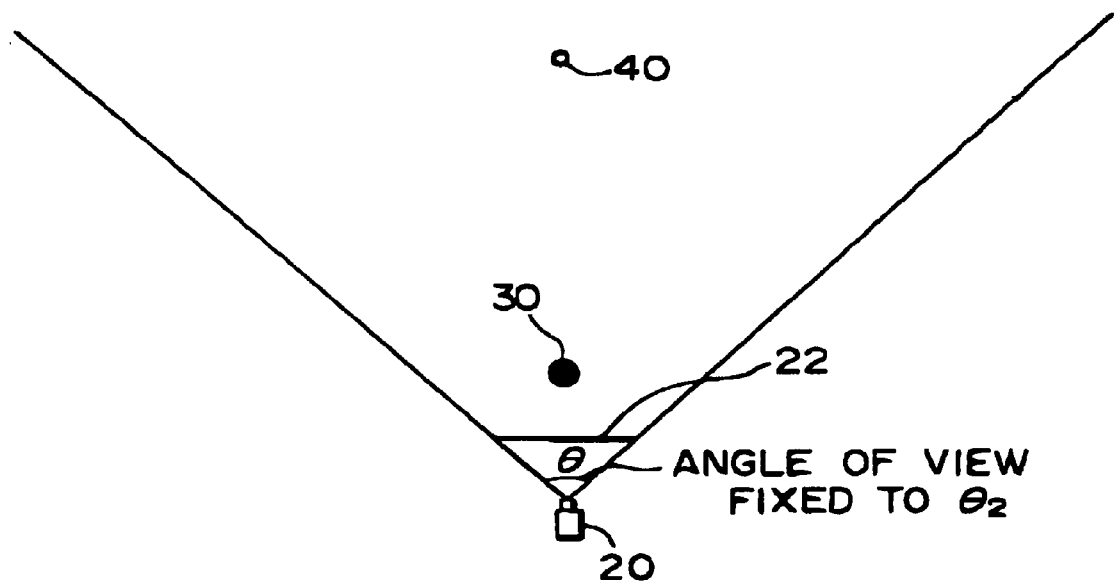
FIGS. 2A and 2B are views illustrating a case when the angle of view is fixed to a relatively large value.
Figure 2B:
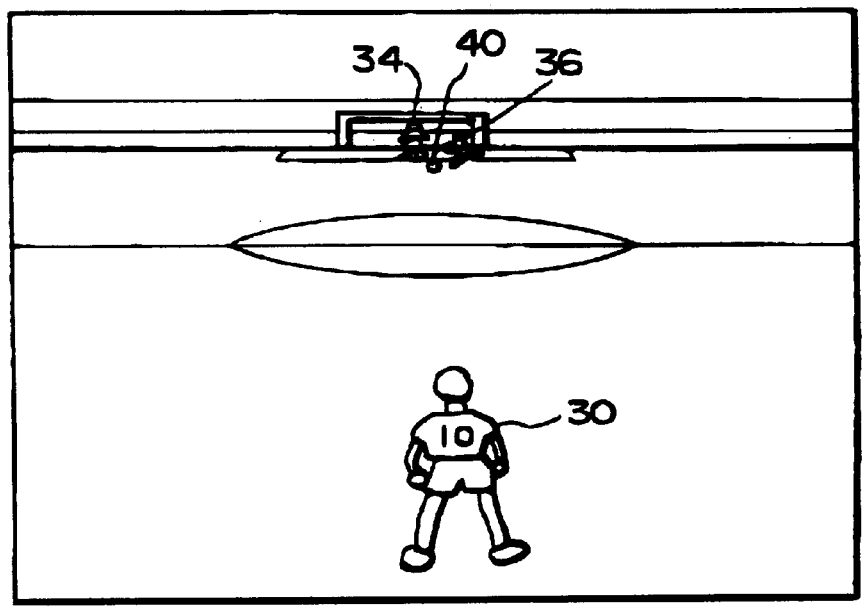

On the other hand, it is assumed that the angle of view θ of the virtual camera 20 is fixed to an angle $θ_2$ which is relatively large, as shown in FIG. 2A. In this time, a distance between the virtual camera 20 and the screen 22 is relatively short. An image generated at this time is shown in FIG. 2B. As shown in FIG. 2B, it is difficult to see clearly the goalkeeper 34, another game character 36 and the ball 40 which are all in the distance from the player's game character. In other words, when the angle of view θ is fixed to a relatively large angle, information about things around the player's game character can be obtained, but it may be difficult to know in detail information of things in the distance from the player's game character.

The present embodiment is directed to configure a game system in which the player controls one fixed player's game character 30. If the player's game character 30 does not keep the ball, therefore, he or she has to watch the soccer play of the other characters. In the game scene of FIG. 2B, for example, the player sees the soccer play of the goalkeeper 34 and the game character 36 with the ball 40. If the player cannot well see the motion of the goalkeeper 34, game character 36 and ball 40, the fun of the game would be lost.

To overcome such problems, the present embodiment causes the virtual camera 20 to follow the player's game character 30 while the angle of view θ of the virtual camera 20 is changed based on the positional information (e.g., coordinates) of the player's game character 30 and ball 40.

More particularly, the distance D between the player's game character 30 and the ball 40 is determined from the coordinates $P_0$, $P_1$ thereof, as shown in FIG. 3. As the distance D is smaller, the angle of view θ is increased. If this distance is larger, the angle of view θ is reduced.

Figure 4A:
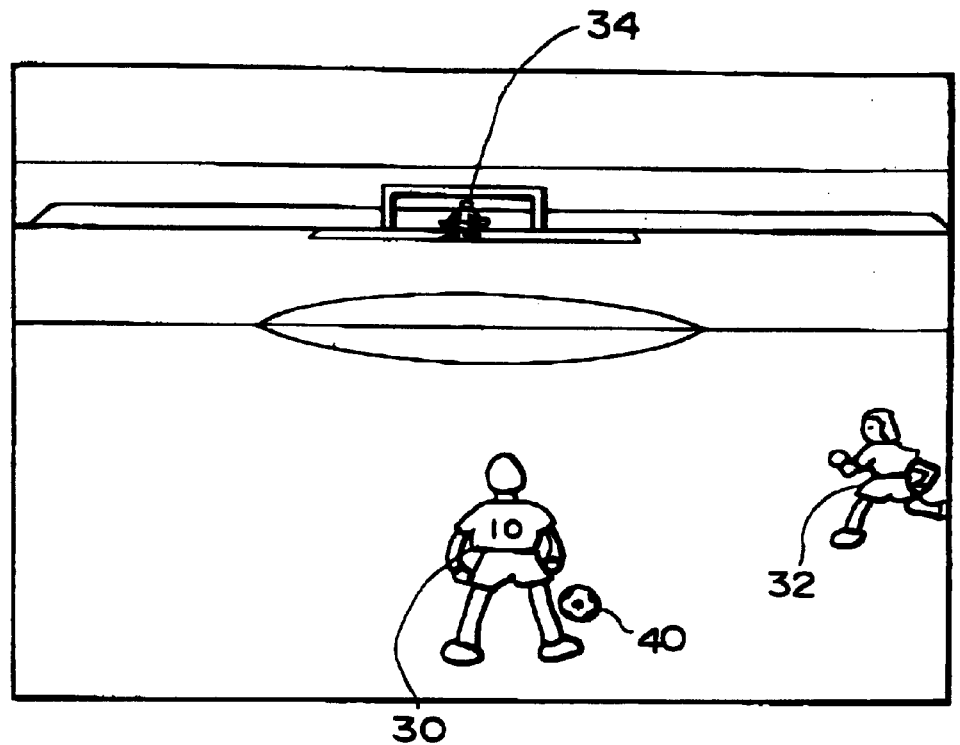
FIGS. 4A and 4B are views illustrating images generated according to the present embodiment.

An image generated in a case where the distance D between the player's game character 30 and the ball 40 is relatively small is shown in FIG. 4A. Since the distance D is relatively small, the angle of view θ is relatively large. Thus, the information of things around the player's game character and ball is capable of being delivered to the player such that the game character 36 can be seen by the player. The motion of the ball 40 in the vicinity of the player's game character 30 also can be seen well by the player. On the other hand, by the technique of FIG. 1A in which the angle of view θ is fixed to a relatively small angle, the game character 36 cannot be seen by the player as shown in FIG. 1B.

Figure 4B:
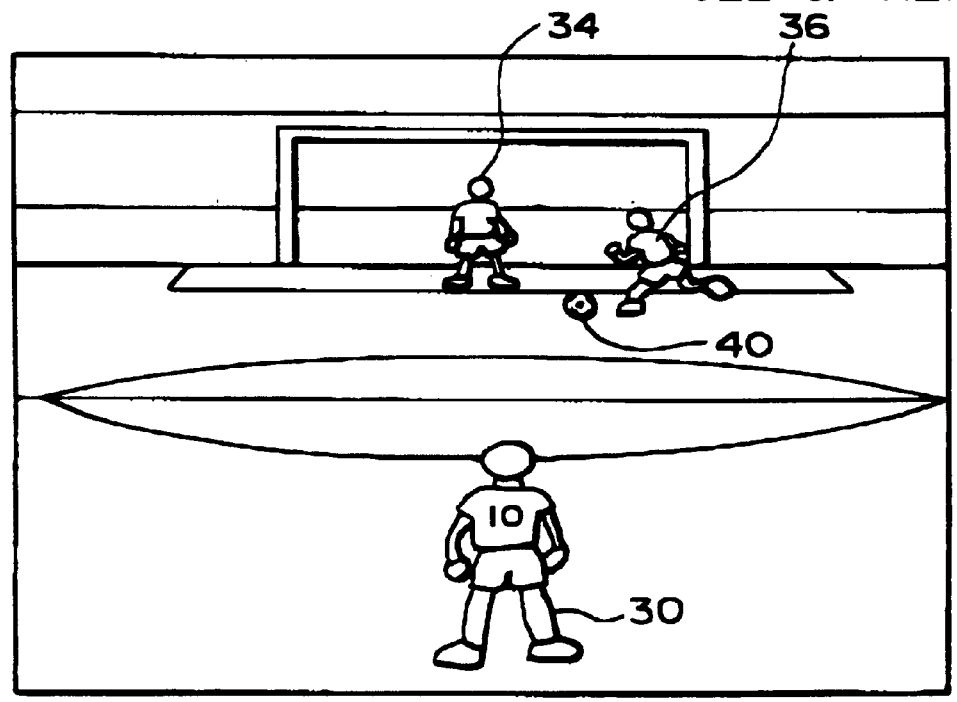

An image generated when the distance D between the player's game character 30 and the ball 40 is relatively long is shown in FIG. 4B. In this case, the angle of view θ is relatively small since the distance D is relatively long. The information about things in the distance from the player's game character can be obtained in detail, or the motion of the goalkeeper 34, the game character 36 and the ball 40 can be seen well by the player. When the goalkeeper 34 and the game character 36 play soccer with the ball 40, therefore, the player can enjoy seeing the play with the concentration being kept. On the other hand, the technique of FIG. 2A in which the angle of view θ is fixed to a relatively large angle, the player cannot see well the motion of the goalkeeper 34, game character 36 and ball 40 as shown in FIG. 2B. Therefore, the player cannot keep feeling enthusiasm for the game.

The present embodiment is characterized that the angle of view θ of the virtual camera 20 is changed based on the coordinates of the player's game character and the ball 40 because information about the ball 40 and things around the ball 40 is particularly important in the game. The ball 40 is in the vicinity of the player's game character 30 in FIG. 4A. Therefore, information about things around the player's game character 30 such as the existence of the game character 32 or the motion of the ball 40 is very important. Because of this, the angle of view θ is changed to be relatively large to deliver such information to the player. In FIG. 4B, the ball 40 is far from the player's game character 30. Therefore, information about distant things such as the goalkeeper 34, the game character 36 or the ball 40 itself is important. Because of this, the angle of view θ is changed to be relatively small to deliver such information of distant things to the player. In this way, information which is important in respective game plays can be transmitted to the player.

The angle of view θ may be changed when a particular event occurs in the game to give a special effect on the game, independent of the coordinates of the player's game character and the ball 40. The present embodiment is different from this technique in that the angle of view θ is changed in real time based on the coordinates $P_0$, $P_1$ of the player's game character 30 and the ball 40 which are changed in real time by the player's control in this embodiment. The coordinates $P_0$ of the player's game character is changed depending on the control by the player. Similarly, the coordinates $P_1$ of the ball 40 is also changed in real time depending on various conditions: the coordinates $P_0$ of the player's game character 30; whether the player's game character 30 is keeping the ball 40; whether the player's game character has kicked the ball 40; the direction of the ball 40 kicked by the player's game character 30; whether the other game character is keeping the ball 40; and so on. It is characteristic of the present embodiment that the angle of view θ is changed in real time based on the coordinates $P_0$, $P_1$ which also changes.

The coordinates $P_0$, $P_1$ are information required to generate a three-dimensional image. Generation of a three-dimensional image is accomplished by determining the coordinates $P_0$, $P_1$ within the object space in real time, arranging displayed objects based on the determined coordinates $P_0$, $P_1$ in the object space, and generating an image through a perspective transformation. Since the coordinates $P_0$, $P_1$ are determined in real time to generate the three-dimensional image, we utilize these coordinates to change the angle of view θ in real time. Accordingly, the coordinates $P_0$, $P_1$ will more effectively be utilized in the present invention.

In the present embodiment, the virtual camera 20 follows the player's game character 30 with inertia. Even if the player's game character 30 is rapidly changed in position or direction, the virtual camera 20 can slowly follow the player's game character 30 with some degree of inertia. Thus, images can be smoothly-displayed.

Figure 5:
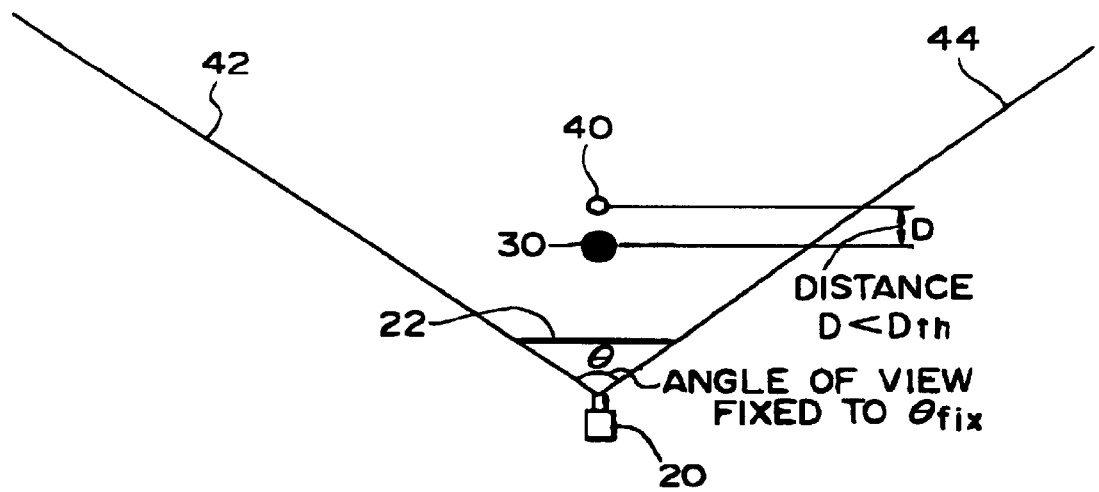
FIG. 5 is a view illustrating a technique by which the angle of view is set at a fixed value when the distance between the player's game character and the ball is less than the threshold value.

The second feature of the present embodiment is that when the distance D between the player's game character 30 and the ball 40 is smaller than a given threshold value, the angle of view is set at a fixed value. As shown in FIG. 5, as the distance D becomes shorter, the angle of view θ is increased as described in FIG. 3 unless the distance D is less than the threshold value $D_{th}$. When the distance D is less than the threshold value $D_{th}$, the angle of view θ is fixed to a value $\theta_{fix}$.

Since the angle of view θ is increased with the distance D being smaller, the angle of view θ is equal to 180 degrees when the position of the player's game character 30 coincides with that of the ball 40. In this case, the volume of the viewing pyramid enclosed by clipping planes 42 and 44 becomes infinite. When the angle of view θ reaches 180 degrees, the perspective transformation cannot be performed to generate an image. As the angle of view θ approaches 180 degrees, end parts of an image on the screen may be distorted. For example, straight objects standing in the image at the opposite ends look inclined.

Occurrence of distortion can be prevented by fixing the angle of view θ to the value $\theta_{fix}$ when the distance D is less than the threshold value $D_{th}$. If such distortion of images occurs or looks noticeable when the angle of view θ is a value $\theta_{dst}$, said value $\theta_{fix}$ can be preferably changed to be less than this value $\theta_{dst}$ to reliably avoid occurrence of distortion.

Figure 6A:
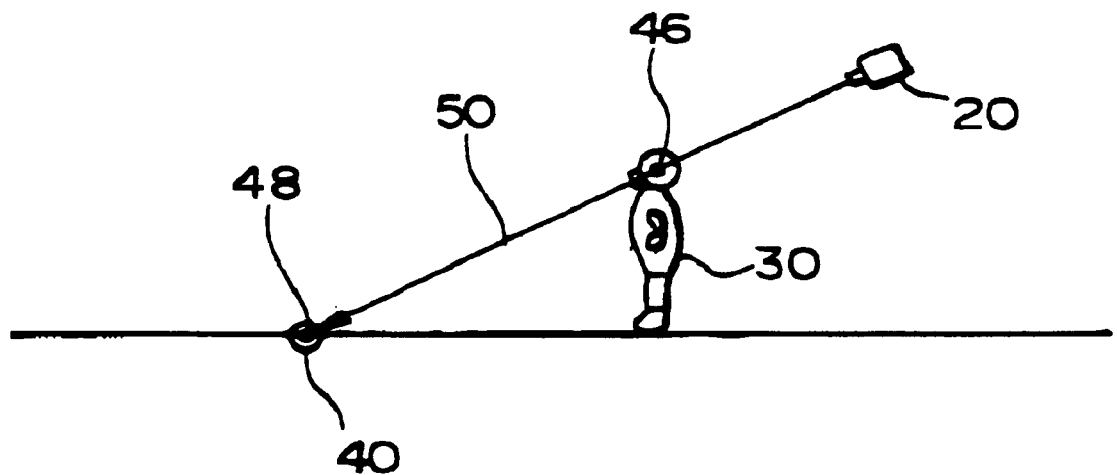
FIGS. 6A and 6B are view illustrating a technique by which the virtual camera is directed in a direction from the player's game character (or its vicinity) toward the ball (or its vicinity).
Figure 6B:
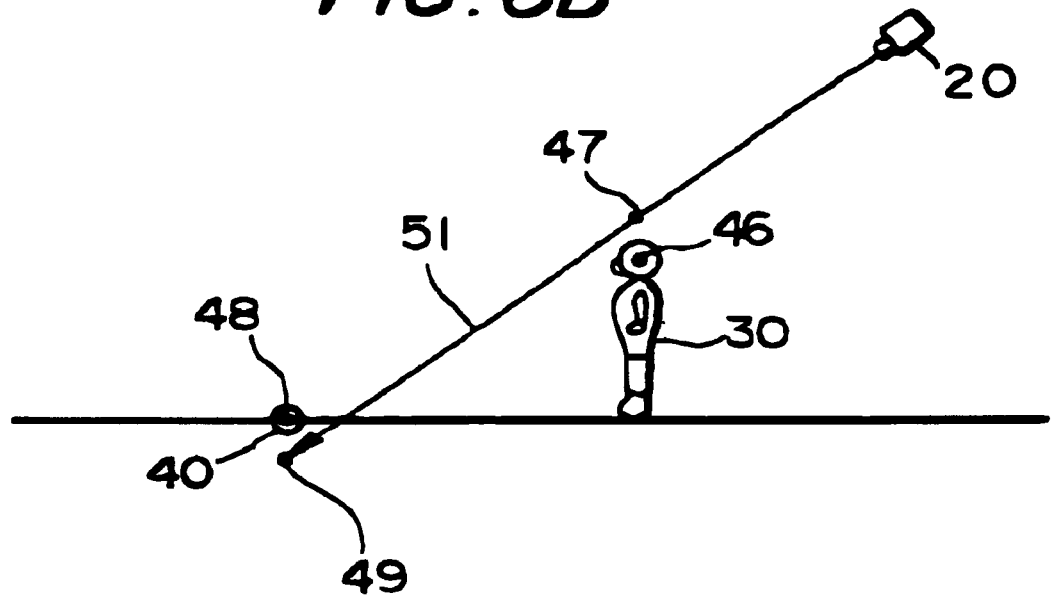

The third feature of the present embodiment is that the virtual camera 20 is always directed to a direction toward the ball 40 (or its vicinity) from the player's game character 30 (or its vicinity). Particularly, as shown in FIG. 6A, the virtual camera 20 (or the camera angle thereof) is always directed along a vector 50 extending from a representative point 46 in the player's game character 30 toward a representative point 48 in the ball 40. Alternatively, the virtual camera 20 may be directed along a vector 51 from a point 47 near the representative point 46 toward a point 49 near the representative point 48, as shown in FIG. 6B.

In such a manner, the gazing point of the virtual camera always follows the ball 40 independent of the coordinates of the player's game character 30 and ball 40. In other words, the ball 40 is always within view of the player and displayed in the central part of the screen. Thus, if the player's game character 30 keeps the ball 40, the player can enjoys the soccer simulating play by causing the player's game character 30 to control the ball 40 while viewing the ball 40 displayed in the central part of the screen.

On the other hand, if the player's game character 30 does not keep the ball 40, the player can watch images around the ball 40. More particularly, the player can watch the motion of the ball 40 in the central part of the screen and the motion of the other characters near the ball 40. Thus, the player can enjoy the game.

This third feature can provide a special effect when it is used in combination with the first feature in which the angle of view is changed based on the coordinates of the player's game character and ball. When the player's game character 30 keeps the ball 40, the ball 40 is always displayed in the central-part of the screen due to the third feature while the angle of view is relatively large due to the first feature. Accordingly, the player can grasp the situation around the player's game character 30 including information about the ball 40.

When the player's game character 30 does not keep the ball 40, the ball 40 which is distant from the player's game character is always displayed in the central part of the screen due to the third feature, and the angle of view is relatively small due to the first feature. Accordingly, the player can clearly grasp only the situation around the ball 40.

It is preferable that the virtual camera 20 is directed along the vector 51 extending from an upper point 47 on the player's game character 30 toward a lower point 49 below the ball 40, as shown in FIG. 6B. Thus, the player's game character 30 can be displayed on the screen below the gazing point (or below the central part of the screen) while the ball 40 can be displayed on the screen above the gazing point. This can effectively prevent such a situation that the ball 40 is hidden by the player's game character 30.

Figure 7:
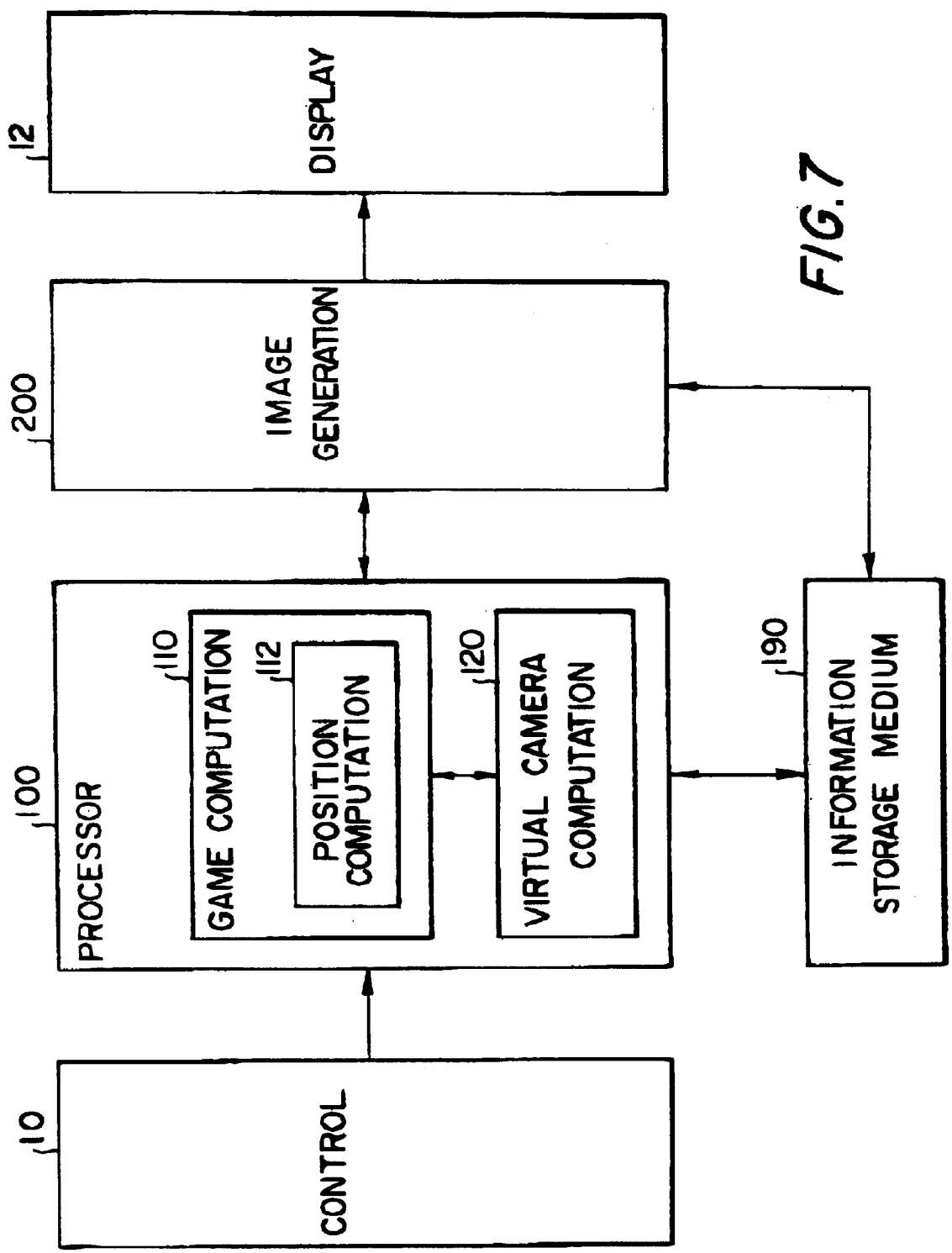
FIG. 7 is a functional block diagram of the present embodiment.

The arrangement of an image generating system according to the present embodiment will now be described. FIG. 7 shows a functional block diagram of this image generating system.

The image generating system comprises a control section 10 for inputting player's operation information into the system through buttons, levers, an acceleration pedal and a steering wheel or the like, and a processing section 100 for receiving the operation information from the control section 10.

The processing section 100 processes data for setting an object space in which a plurality of objects are arranged, based on the operation information and a given program and others. The processing section 100 may be formed by suitable hardware such as CPU.

The image generating system also comprises an image generating section 200 which generates an image as seen from a virtual camera within the object space. The image generating section 200 may be formed by suitable hardware such as CPU, digital signal processor (DSP), or application specific IC (ASIC) for image generation. An image generated by the image generating section 200 is displayed on a display 12.

The image generating system further comprises an information storage medium 190 which mainly stores programs, image data and so on. The information storage medium 190 may be formed by suitable means such as CD-ROM, game cassette, IC card, magnet-optical (MO) disk, floppy disk (FD), digital video disk (DVD), hard disk, or ROM. The processing and image generating sections 100, 200 perform various processes based on the information (including programs and data) from the information storage medium 190.

The processing section 100 comprises a game computation section 110 and a virtual camera computation section 120. The game computation section 110 processes data for progressing a game. It performs game mode setting, game progress, determination of coordinates of objects and so on. In such a case, the process for determining the coordinates of the objects based on the operation information from the control section 10 and the programs is accomplished by a position computation section 112 in the game computation section 110. The coordinates of the player's game character and ball in each frame are outputted from the position computation section 112 toward the virtual camera computation section 120.

The virtual camera computation section 120 processes data for determining the position, direction and the angle of view of the virtual camera based on the coordinates of the player's game character and ball from the position computation section 112 and the program and data from the information storage medium 190.

The virtual camera computation section 120 processes data for causing the virtual camera to follow the player's game character and for changing the angle of view of the virtual camera based on the coordinates of the player's game character and ball. The virtual camera computation section 120 also processes data for fixing the angle of view when the distance between the player's game character and the ball is less than a threshold value and for directing the virtual camera along a direction from the player's game character (or its vicinity) toward the ball (or its vicinity).

Figure 8:
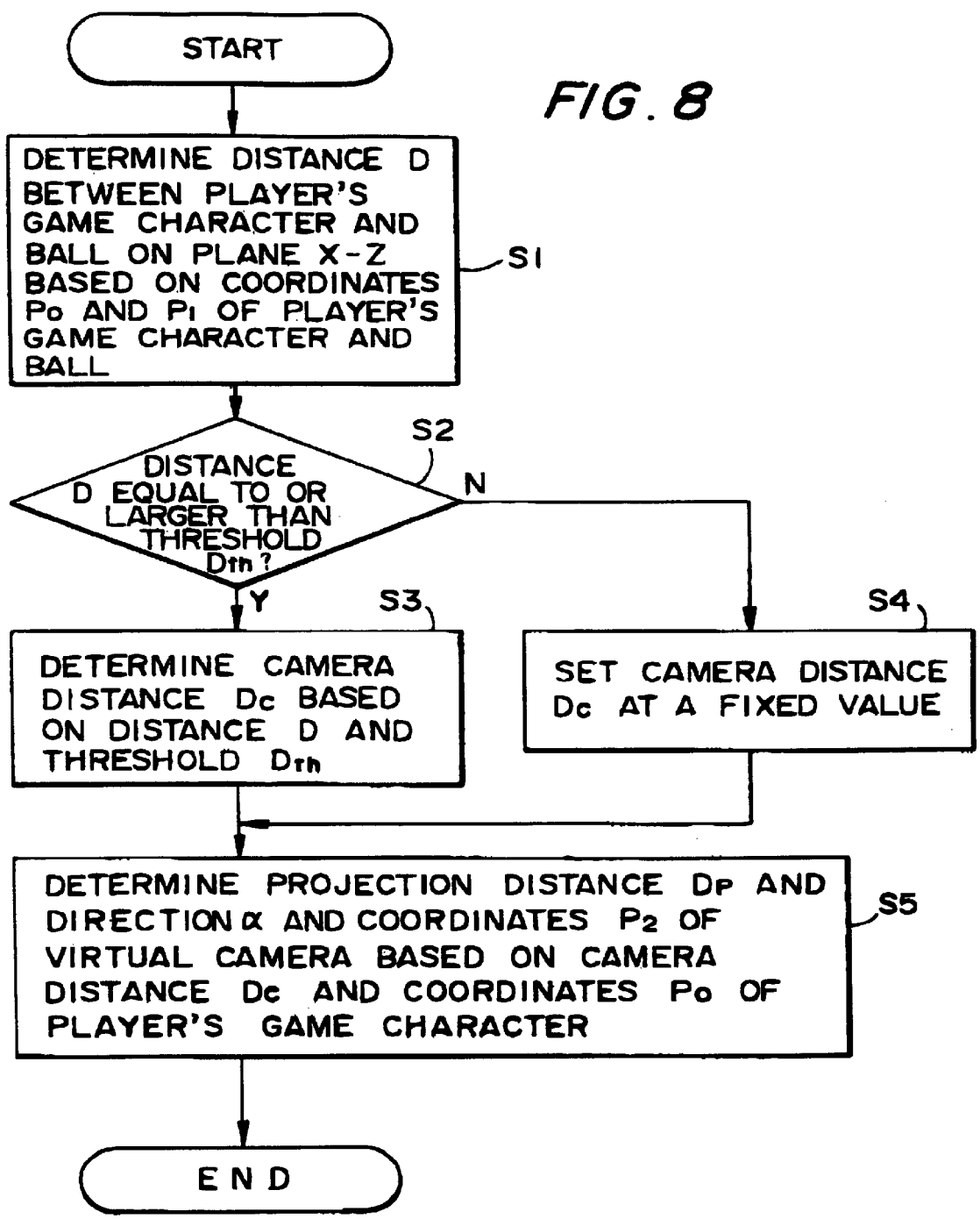
FIG. 8 is a flow chart illustrating the operation in the present embodiment.

The details of the operation in the present embodiment will be described with reference to the flow chart of FIG. 8 and FIGS. 9A and 9B.

Figure 9A:
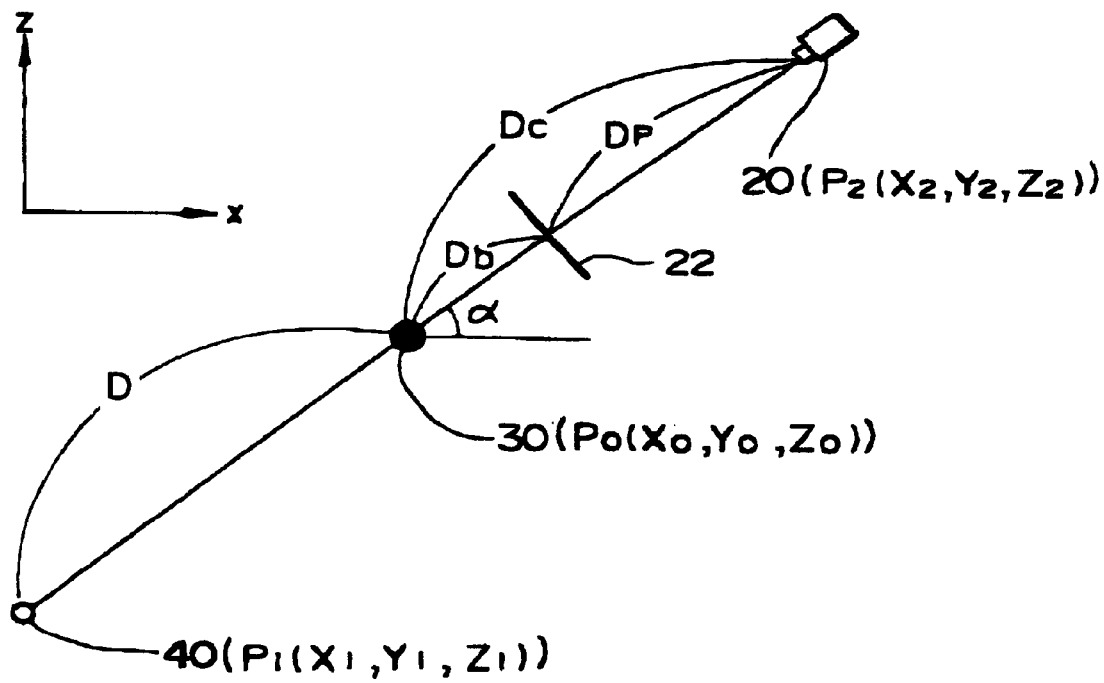
FIGS. 9A and 9B are views illustrating another operation in the present embodiment.

As shown in FIG. 9A, the distance D on X-Z plane is first determined from the following formula (1) based on the coordinates $P_0$, $P_1$ of the player's game character 30 and ball 40 (Step S1).

$$D = \{(X_0 - X_1)^2 + (Z_0 - Z_1)^2\}^{1/2} \quad (1)$$

Next, it is determined whether or not the distance D is at least a threshold value $D_{th}$ (Step S2). If the distance D is equal to or larger than the threshold value $D_{th}$, a camera distance $D_c$ is then determined from the following formula (2) based on these values D and $D_{th}$ (Step S3).

$$D_c = A \times D / D_{th} \quad (2)$$

where A is a constant.

If the distance D is less than the threshold value $D_{th}$, the camera distance $D_c$ is then determined from the following formula (3) (Step S4).

$$D_c = A \quad (3)$$

Based on the camera distance $D_c$ thus determined and the coordinates $P_0$ of the player's game character 30, a projection distance $D_p$ (or the distance between the virtual camera 20 and the screen 22), a direction a of the virtual camera (camera angle) and coordinates $P_2$ ($X_2$, $Y_2$, $Z_2$) of the virtual camera 20 are then determined from the following formulas (4) and (5) (Step S5).

$$D_p = D_c - D_b \quad (4)$$

where $D_b$ is a constant.

$$\alpha = \tan^{-1}\{(Z_0 - Z_1)/(X_0 - X_1)\}$$
$$X_2 = X_0 + D_c \times \cos \alpha$$
$$Y_2 = Y_0$$
$$Z_2 = Z_0 + D_c \times \sin \alpha \quad (5)$$

When the camera and projection distances $D_c$, $D_p$ are determined according to the above formulas (2) and (4), the angle of view θ can be decreased as the distance D between the player's game character 30 and the ball 40 increases. On the other hand, the angle of view θ can be increased as the distance D decreases.

Figure 9B:
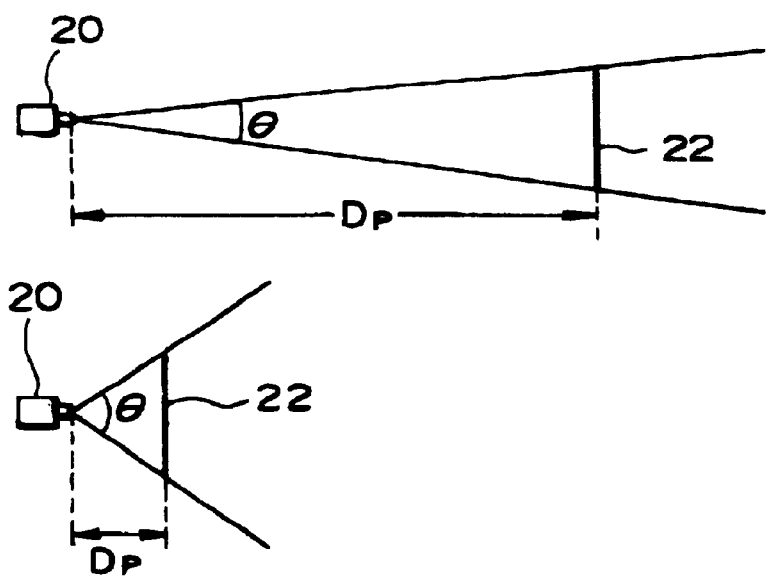

Since the size of the screen 22 is invariable in the perspective transformation, changing the projection distance $D_p$ is mathematically equivalent to changing the angle of view θ, as shown in FIG. 9B.

When the camera and projection distances $D_c$, $D_p$ are determined according to the above formulas (3) and (4), the camera and projection distances $D_c$, $D_p$ can be set at fixed values if the distance D is less than the threshold value $D_{th}$. Thus, the angle of view θ can be set at a fixed value.

When the direction α and coordinates $P_2$ of the virtual camera 20 are determined according to the above formulas (5), the virtual camera 20 can be directed in the direction from the player's game character 30 toward the ball 40.

Figure 10:
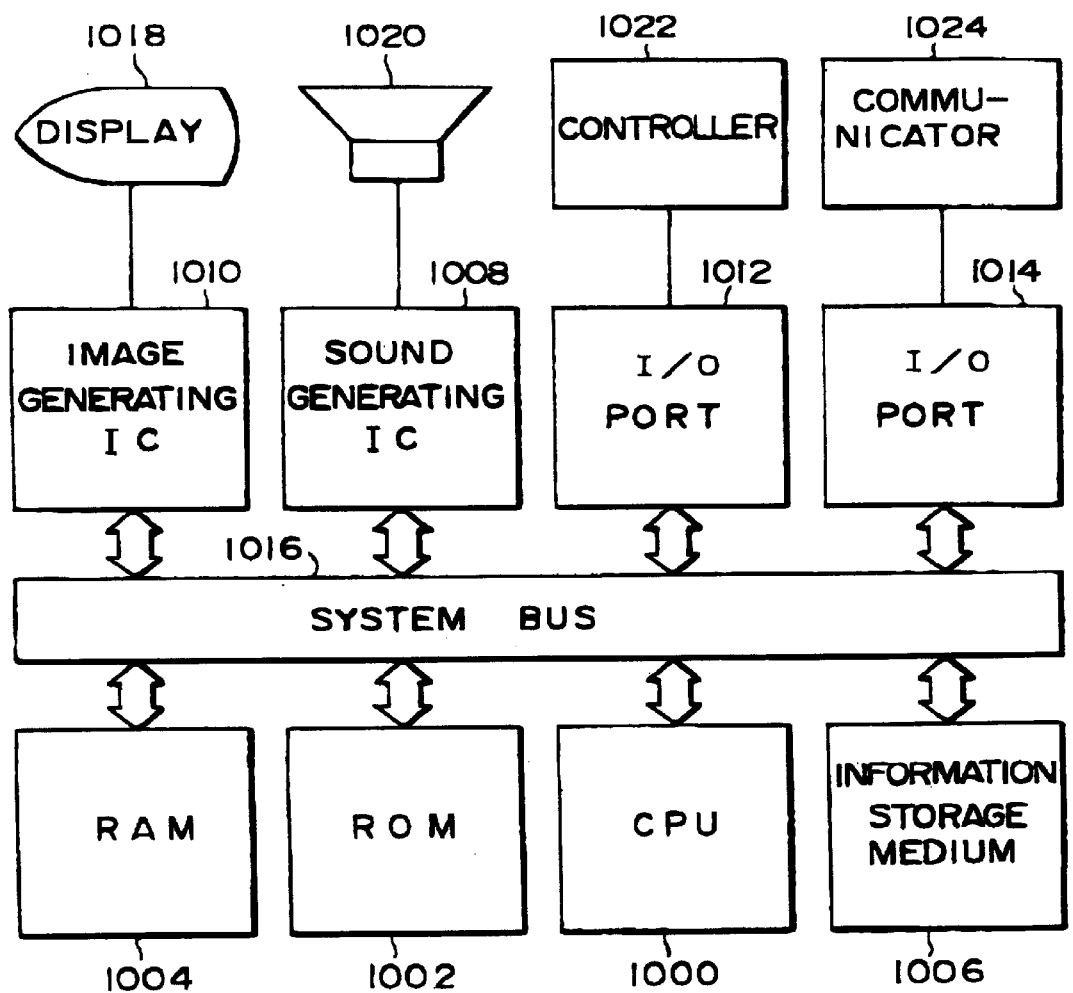
FIG. 10 is a block diagram of hardware suitable for realizing the present embodiment.

An arrangement of hardware which can realize the present embodiment will be described with reference to FIG. 10. The hardware comprises a CPU 1000, a ROM 1002, a RAM 1004, an information storage medium 1006, a sound generating IC 1008, an image-generating IC 1010 and I/O ports 1012, 1014, all of which are interconnected together through a system bus 1016 for transmission/reception. The image generating IC 1010 is connected to a display 1018; the sound generating IC 1008 is connected to a speaker 1020; the I/O port 1012 is connected to a control device 1022; and the I/O port 1014 is connected to a communication device 1024.

The information storage medium 1006 stores mainly programs, image data used for representing objects, sound data and so on. For example, a domestic game system may include a CD-ROM, game cassette or DVD as an information storage medium for storing game programs and so on. An arcade game system may use a ROM or the like. In such a case, the information storage medium 1006 becomes the ROM 1002.

The control device 1022 corresponds to a game controller or control panel and is used for inputting the results of judgment performed by a player during progress of game into the system.

The CPU 1000 performs the control of the entire system and various data processings according to the programs stored in the information storage medium 1006, the system program (system initialization and the like) stored in the ROM 1002, input signals from the control device 1022 and so on. The RAM 1004 is a storage means used as a working area or the like for the CPU 1000 and stores given contents of the information storage medium 1006 and ROM 1002, the results of computation by the CPU 1000 and so on. A structure of data having a logical configuration as a table data or the like can be configured on the RAM or information storage medium.

Since the system includes the sound generating IC 1008 and the image generating IC 1010, the sounds and images of the game can be outputted in a preferred manner. The sound generating IC 1008 is an integrated circuit for generating game sounds such as effect sounds and background music based on the information stored in the information storage medium 1006 and ROM 1002. The generated game sounds are outputted through the speaker 1020. The image generating IC 1010 is an integrated circuit for generating pixel information to be outputted toward the display 1018 based on the image information from the RAM 1004, ROM 1002, information storage medium 1006 and so on. The display 1018 may be a so-called "head mount display (HMD)".

The communication device 1024 sends and receives the various information utilized in the game system to and from external means. The communication device 1024 may be connected to other game system for transmitting/receiving given information depending on the game programs or for transmitting/receiving the information of game programs and the like through a communication line.

Various processes described in connection with FIGS. 1–7, 9A and 9B are realized by the information storage medium 1006 which stores the programs for performing such processes as shown in the flow chart of FIG. 8 and by the CPU 1000, image generating IC 1010, sound generating IC 1008 and others which are controlled according to the programs. The processes performed by the image generating IC 1010, sound generating IC 1008 and others may be performed by CPU 1000 or an all-purpose DSP in a software manner.

Figure 11A:
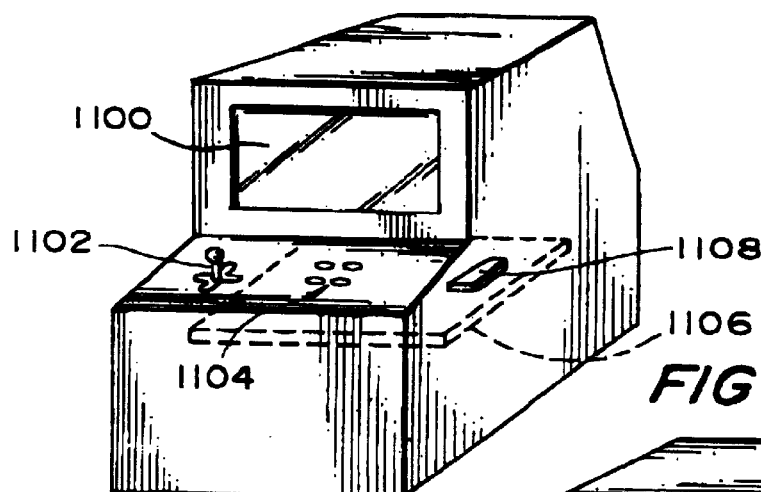
FIGS. 11A, 11B and 11C are views illustrating various device forms to which the present embodiment can be applied.

FIG. 11A shows an arcade game system to which the present embodiment is applied. A player enjoys a game by operating a lever 1102, buttons 1104 and so on while viewing a game image displayed on a display 1100. A system board 1106 in the system comprises a CPU, an image generating IC, a sound generating IC and so on. A memory 1108 or information storage medium on the system board 1106 stores various information, that is: information for causing the virtual camera to follow the first displayed object while changing the angle of view of the virtual camera based on the positional information of the first and second displayed objects; information for generating an image as seen from the virtual camera; information for increasing the angle of view as the distance between the first and second displayed objects decreases and for decreasing the angle of view as the distance increases; information for setting the angle of view at a fixed value if the distance between the first and second displayed objects is less than a given threshold value; information for directing the virtual camera in a direction from the first displayed object or its vicinity toward the second displayed object or its vicinity; and other information. These information will be called "stored information" hereinafter. The stored information includes at least one of program codes for performing the above processes, image information, sound information, object shape information, table data, list data, player information and so on.

Figure 11B:
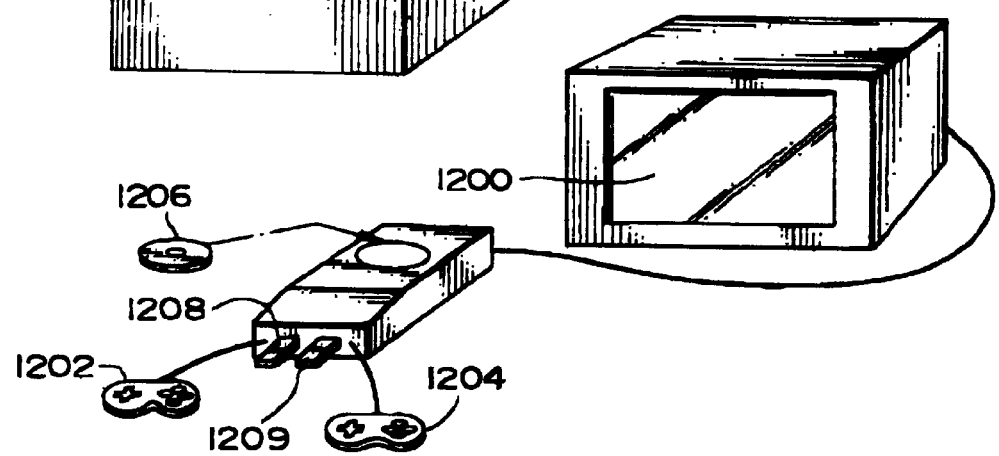

FIG. 11B shows a domestic game system to which the present embodiment is applied. Players enjoy a game by operating game controllers 1202 and 1204 while viewing a game image displayed on a display 1200. In such a case, the stored information has been stored in a CD-ROM 1206, IC cards 1208, 1209 and so on which are information storage media detachably mounted in the system.

Figure 11C:
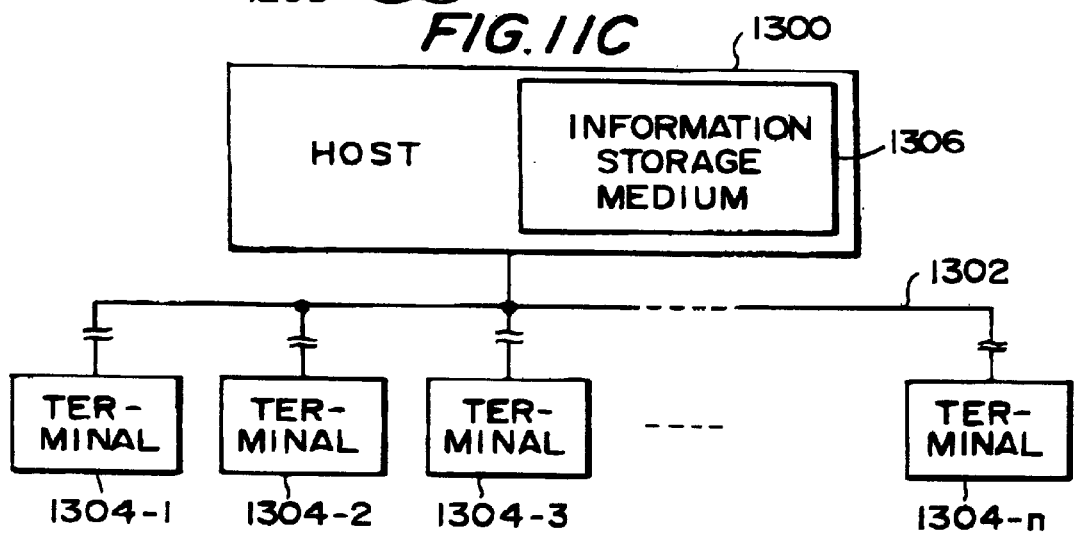

FIG. 11C shows another game system to which the present embodiment is applied. This game system comprises a host device 1300 and terminals 1304-1 through 1304-n which are connected to the host device 1300 through a communication line 1302. In such a case, the stored information has been stored, for example, in an information storage medium 1306 which may be any one of a magnetic disc device, magnetic tape device, memory and so on, all of which can be controlled by the host device 1300. If each of the terminals 1304-1 through 1304-n is a stand-alone machine which includes a CPU, an image generating IC and a sound generating IC to generate game images and game sounds, a game program for generating game images and game sounds and so on are delivered to each of the terminals 1304-1 through 1304-n. If each of the terminals 1304-1 through 1304-n is not a stand-alone machine and cannot generate game images and game sounds, the host device 1300 generates game images and game sounds which are in turn fed to all the terminals 1304-1 through 1304-n.

The present invention is not limited to the described embodiment, and can be implemented in various ways.

For example, when the angle of view of the virtual camera is to be changed, it is particularly desirable that the angle of view is decreased when the distance between the first and second displayed objects is increased, and the angle of view is increased when that distance is decreased. However, the present invention is not limited to such an arrangement, but may be carried out in various other arrangements as far as the angle of view can be changed depending on at least the positional information of the first and second displayed objects.

The present invention is particularly desirable when it is used in a sports simulation game using a ball as described in connection with the present embodiment, such as Rugby football game, ice hockey game, field hockey game, American football game, tennis game, baseball game and so on. Unlike the conventional sports simulation games in which an image is generated as seen from a third person view, the present invention can generate an image as seen from a first person view to be more preferable for the game play in which the virtual camera follows a particular displayed object. In such a case, the first displayed object may be a character coming on the game and the second displayed object may be a ball controllable by the character.

Figure 12A:
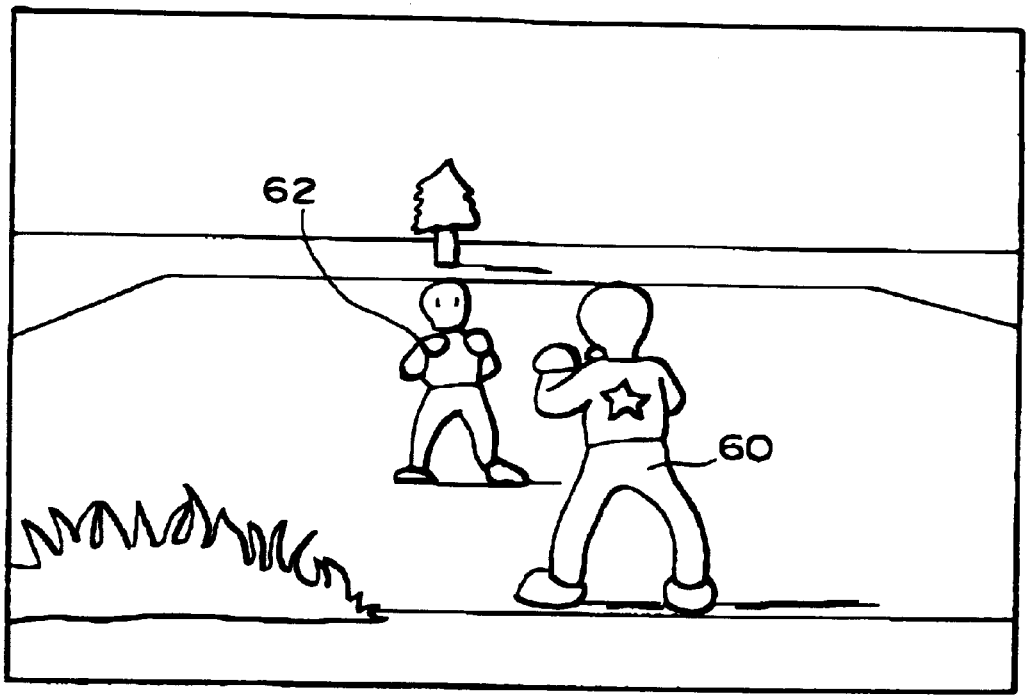
FIGS. 12A and 12B are views illustrating images in a fighting game to which the present embodiment is applied.
Figure 12B:
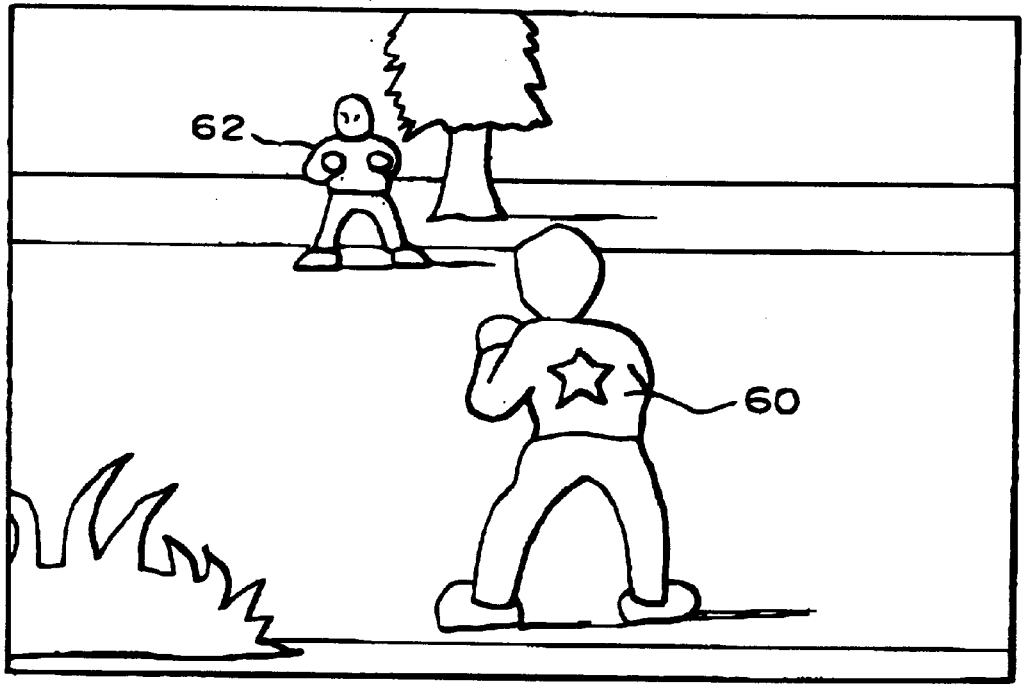

However, the present invention is not limited to such sports simulation games, but may be applied to various other games. FIGS. 12A and 12B show images generated when the present invention is applied to a fighting game (person to person or tank to tank). In FIGS. 12A and 12B, the first displayed object is a first game character 60 coming on the game while the second object is a second game character 62 to fight against the first game character 60. If the distance between the first and second game characters 60, 62 is relatively short, the angle of view is relatively large as shown in FIG. 12A. On the contrary, if the distance is relatively long, the angle of view is relatively small as shown in FIG. 12B. In FIG. 12A, therefore, the player can clearly grasp information around the first game character 60 controlled by the player. In FIG. 12B, the player can clearly know about the second game character 62 in the distance.

Figure 13:
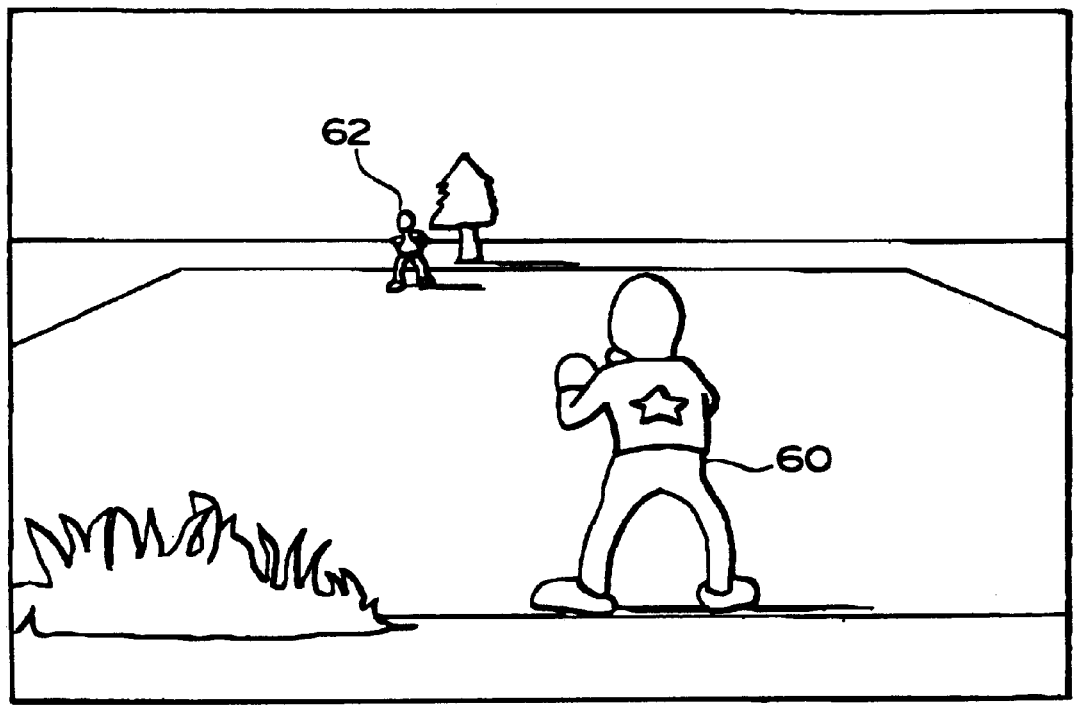
FIG. 13 shows an image generated when the angle of view is fixed.

FIG. 13 shows an image generated when the angle of view is fixed irrespective of the distance between the first and second game characters 60, 62. In such a case, the player cannot know in detail about the second game character 62 in the distance.

Figure 14A:
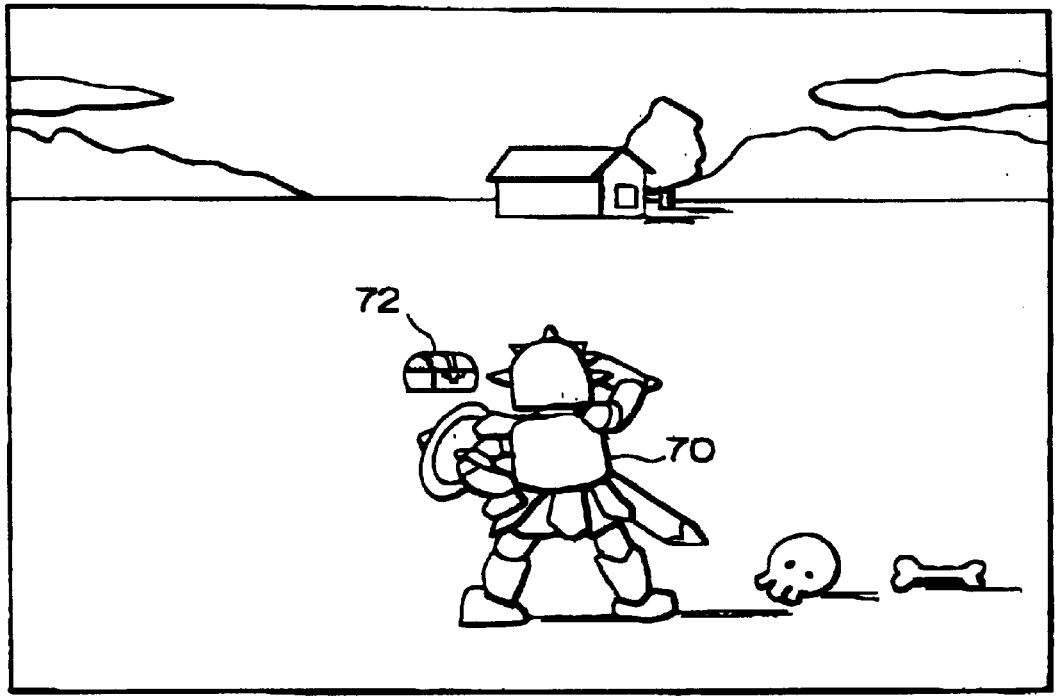
FIGS. 14A and 14B are views illustrating images generated when the present invention is applied to a role-playing game.
Figure 14B:
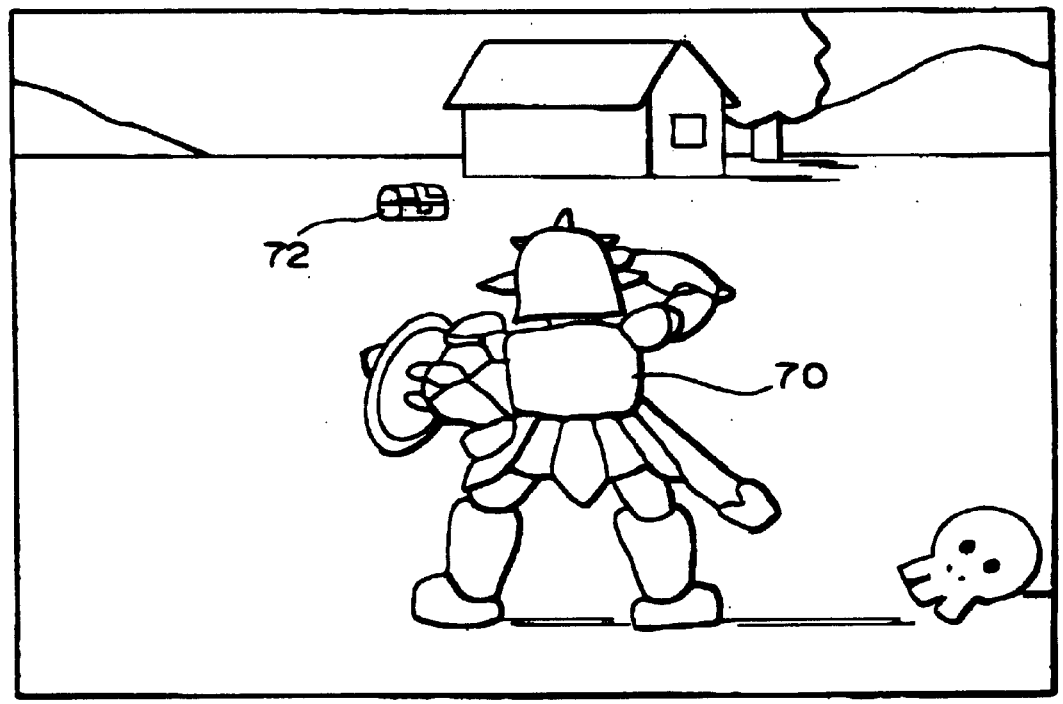

FIGS. 14A and 14B show images generated when the present invention is applied to a role-playing game. In FIGS. 14A and 14B, the first displayed object is a character 70 coming on the game while the second object is an item 72 to be acquired by the character 70. When the distance between the character 70 and the item 72 is relatively short, the angle of view is relatively large as shown in FIG. 14A. If the distance is relatively long, the angle of view is relatively small as shown in FIG. 14B. In FIG. 14A, thus, the player can more clearly grasp information around the character 70 controlled by the player. In FIG. 14B, the player can clearly know about the item 72 in the distance.

Figure 15:
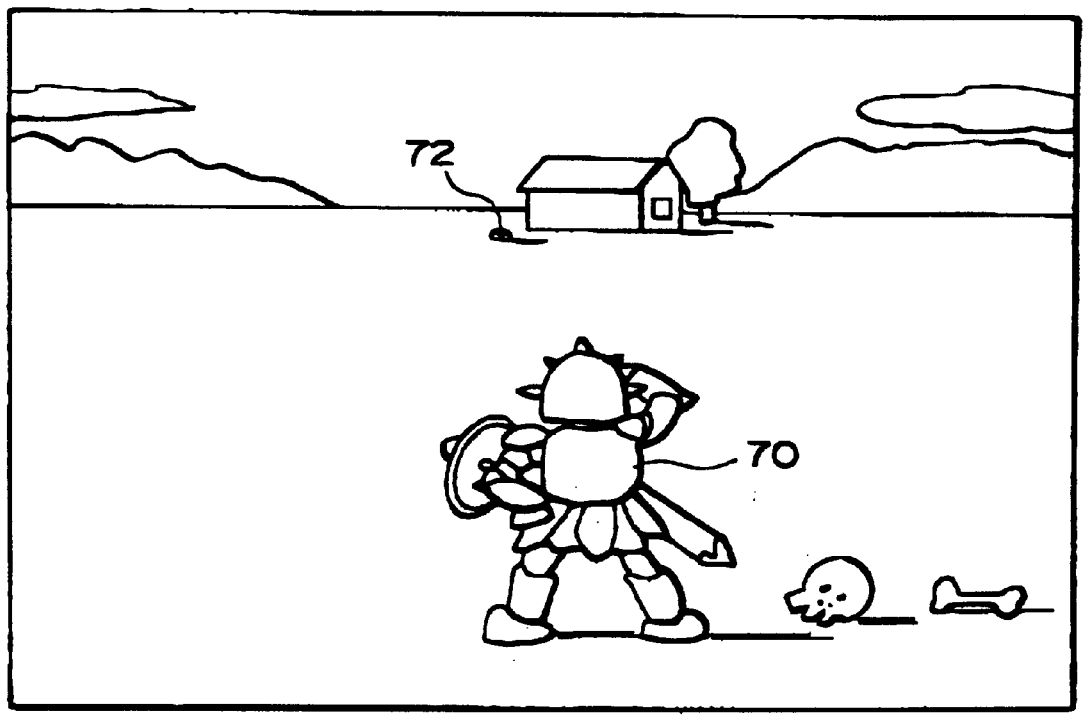
FIG. 15 shows an image generated when the angle of view is fixed.

FIG. 15 shows an image generated when the angle of view is fixed irrespective of the distance between the character 70 and the item 72. In such a case, the player cannot clearly know about the item 72 in the distance.

The present invention can be applied not only to the domestic and arcade game systems, but also to various other systems such as a big-sized attraction system in which a number of players can enjoy a game, a personal computer, a multimedia terminal, a system board for generating images and so on.

What is claimed is:

1. An image generating system for generating an image as seen from a virtual camera in an object space in which at least first and second displayed objects are disposed, said image generating system comprising:

means for causing said virtual camera to follow said first displayed object and for changing the angle of view of said virtual camera based on positional information about said first and second displayed objects; and means for generating an image as seen from said virtual camera.

2. The image generating system as defined in claim 1, wherein the angle of view of said virtual camera is increased as the distance between said first and second displayed objects decreases; and wherein the angle of view of said virtual camera is decreased as the distance between said first and second displayed objects increases.

3. The image generating system as defined in claim 1, wherein the angle of view of said virtual camera is set to a fixed value when the distance between said first and second displayed objects becomes smaller than a given threshold value.

4. The image generating system as defined in claim 2, wherein the angle of view of said virtual camera is set to a fixed value when the distance between said first and second displayed objects becomes smaller than a given threshold value.

5. The image generating system as defined in claim 1, wherein said virtual camera is directed in a direction from said first displayed object or the vicinity of said first displayed object toward said second displayed object or the vicinity of said second displayed object.

6. The image generating system as defined in claim 2, wherein said virtual camera is directed in a direction from said first displayed object or the vicinity of said first displayed object toward said second displayed object or the vicinity of said second displayed object.

7. The image generating system as defined in claim 3, wherein said virtual camera is directed in a direction from said first displayed object or the vicinity of said first displayed object toward said second displayed object or the vicinity of said second displayed object.

8. The image generating system as defined in claim 4, wherein said virtual camera is directed in a direction from said first displayed object or the vicinity of said first displayed object toward said second displayed object or the vicinity of said second displayed object.

9. The image generating system as defined in claim 1, wherein said virtual camera follows said first displayed object with inertia.

10. The image generating system as defined in claim 1,
wherein said first displayed object represents a game character and said second displayed object represents a ball controllable by said game character in a game which is played by using said image generated by said image generating system.

11. The image generating system as defined in claim 1,
wherein said first displayed object represents a first game character and said second displayed object represents a second game character who fights against said first game character in a game which is played by using said image generated by said image generating system.

12. The image generating system as defined in claim 1,
wherein said first displayed object represents a game character and said second displayed object represents an item to be obtained by said game character in a game which is played by using said image generated by said image generating system.

13. An image generating system for generating an image which is used to play a sports simulation game by a player, said image representing a plurality of displayed objects including a game character controlled by said player through a control means and a ball controllable by said game character, said image generating system comprising:

means for computing positional information about said game character and said ball in each frame based on operation information inputted through said control means;

means for causing a virtual camera to follow said game character and for changing the angle of view of said virtual camera based on said positional information about said game character and said ball; and means for generating an image as seen from said virtual camera in an object space in which a plurality of said objects including said game character and said ball are disposed.

14. The image generating system as defined in claim 13,
wherein said player controls only one particular game character which is selected from a plurality of game characters in said game.

15. An information storage medium to be used in an image generating system for generating an image as seen from a virtual camera in an object space in which at least first and second displayed objects are disposed, said information storage medium comprising:

information for causing said virtual camera to follow said first displayed object and for changing the angle of view of said virtual camera based on positional information about said first and second displayed objects; and information for generating an image as seen from said virtual camera.

16. The information storage medium as defined in claim 15,
wherein the angle of view of said virtual camera is increased as the distance between said first and second displayed objects decreases; and
wherein the angle of view of said virtual camera is decreased as the distance between said first and second displayed objects increases.

17. The information storage medium as defined in claim 15,
wherein the angle of view of said virtual camera is set to a fixed value when the distance between said first and second displayed objects becomes smaller than a given threshold value.

18. The information storage medium as defined in claim 15,
wherein said virtual camera is directed in a direction from said first displayed object or the vicinity of said first displayed object toward said second displayed object or the vicinity of said second displayed object.

19. An information storage medium to be used in an image generating system for generating an image which is used to play a sports simulation game by a player, said image representing a plurality of displayed objects including a game character controlled by said player through a control means and a ball controllable by said game character, said information storage medium comprising:

information for computing positional information about said game character and said ball in each frame based on operation information inputted through said control means;

information for causing a virtual camera to follow said game character and for changing the angle of view of said virtual camera based on said positional information about said game character and said ball; and information for generating an image as seen from said virtual camera in an object space in which a plurality of said objects including said game character and said ball are disposed.

20. The information storage medium as defined in claim 19,
wherein said player controls only one particular game character which is selected from a plurality of game characters in said game.

21. The image generating system as defined in claim 13,
wherein the angle of view of said virtual camera is increased as the distance between said game character and said ball decreases; and
wherein the angle of view of said virtual camera is decreased as the distance between said game character and said ball increases.

22. The image generating system as defined in claim 13,
wherein the angle of view of said virtual camera is set to a fixed value when the distance between said game character and said ball becomes smaller than a given threshold value.

23. The image generating system as defined in claim 13,
wherein said virtual camera is directed in a direction from said game character or the vicinity of said game character toward said ball or the vicinity of said ball.

24. The image generating system as defined in claim 13,
wherein said virtual camera follows said game character with inertia.

25. The information storage medium as defined in claim 15,
wherein said virtual camera follows said first displayed object with inertia.

26. The information storage medium as defined in claim 19,
wherein the angle of view of said virtual camera is increased as the distance between said game character and said ball decreases; and
wherein the angle of view of said virtual camera is decreased as the distance between said game character and said ball increases.

27. The information storage medium as defined in claim 19,
wherein the angle of view of said virtual camera is set to a fixed value when the distance between said game character and said ball becomes smaller than a given threshold value.

28. The information storage medium as defined in claim 19, wherein said virtual camera is directed in a direction from said game character or the vicinity of said game character toward said ball or the vicinity of said ball.

29. The information storage medium as defined in claim 19, wherein said virtual camera follows said game character with inertia.

* * * * *